(12) United States Patent
Thisius et al.

(10) Patent No.: US 9,073,639 B2
(45) Date of Patent: Jul. 7, 2015

(54) TRACKING TABLE ASSEMBLY

(71) Applicant: Cessna Aircraft Company, Wichita, KS (US)

(72) Inventors: Todd Thisius, Cheney, KS (US); Matthew R. Harrell, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 14/185,500

(22) Filed: Feb. 20, 2014

(65) Prior Publication Data

US 2014/0300146 A1 Oct. 9, 2014

Related U.S. Application Data

(60) Provisional application No. 61/808,034, filed on Apr. 3, 2013.

(51) Int. Cl.
*A47B 11/00* (2006.01)
*B64D 11/00* (2006.01)

(52) U.S. Cl.
CPC .................... *B64D 11/00* (2013.01)

(58) Field of Classification Search
CPC ......... G02B 21/26; B60N 3/002; A47B 31/06
USPC ............. 108/44, 45, 152, 147, 143, 137; 74/490.13, 89.17
See application file for complete search history.

(56) References Cited

U.S. PATENT DOCUMENTS

| | | | |
|---|---|---|---|
| 3,632,161 A | 1/1972 | Arfaras et al. | |
| 5,357,819 A * | 10/1994 | Takei | 108/143 |
| 5,460,059 A * | 10/1995 | Kato | 108/143 |
| 5,533,844 A * | 7/1996 | Ekleberry | 108/143 |
| 5,547,247 A | 8/1996 | Dixon | |
| 5,681,116 A * | 10/1997 | Lin | 108/143 |
| 5,918,506 A * | 7/1999 | Rantanen | 108/143 |
| 6,186,024 B1 * | 2/2001 | Leiber | 108/143 |
| 6,427,546 B2 * | 8/2002 | Alber | 74/89.17 |
| 6,793,281 B2 | 9/2004 | Duerr et al. | |
| 6,986,370 B1 * | 1/2006 | Schoene et al. | 108/143 |
| 7,181,988 B2 * | 2/2007 | Nagai et al. | 74/89.22 |
| 7,798,072 B2 | 9/2010 | Becker et al. | |
| 7,966,952 B2 | 6/2011 | Fissette et al. | |

(Continued)

OTHER PUBLICATIONS

PCT Application Serial No. PCT/US2014/032859 International Search Report and Written Opinion dated Aug. 4, 2014, 15 pages.

*Primary Examiner* — Jose V Chen
(74) *Attorney, Agent, or Firm* — Lathrop & Gage LLP

(57) ABSTRACT

Disclosed is a foldable tracking table assembly comprising a primary leaf, and a secondary leaf rotatably secured to the primary leaf and a table bracket secured to the opposite end of the primary leaf The table bracket in turn is secured to an adapter plate which is atop one or more pillow blocks. The pillow blocks are disposed atop linear rails upon which the pillow blocks are capable of longitudinally traversing. Adjacent the linear rail is a serrated track parallel to the at least one rail and a serrated pawl capable of locking engagement with the serrated track. A solenoid facilitates the locking engagement of the pawl with the serrated track wherein a user of the table assembly manually activates the solenoid withdrawing the serrated pawl from locking engagement with the serrated track thereby allowing the table assembly to traverse the linear rail to a position that accommodates the user.

26 Claims, 7 Drawing Sheets

(56) References Cited

U.S. PATENT DOCUMENTS

| | | | |
|---|---|---|---|
| 8,007,061 B2* | 8/2011 | Song | 108/143 |
| 2007/0145791 A1 | 6/2007 | Strasser | |
| 2008/0092784 A1 | 4/2008 | Merensky | |
| 2008/0156233 A1* | 7/2008 | Paddock et al. | 108/44 |
| 2011/0156450 A1 | 6/2011 | Collins et al. | |
| 2012/0133180 A1 | 5/2012 | Moulton et al. | |
| 2014/0137776 A1* | 5/2014 | Thomas et al. | 108/143 |
| 2014/0318422 A1* | 10/2014 | Neuhaus et al. | 108/44 |

* cited by examiner

TRACKING TABLE ASSEMBLY

RELATED APPLICATION

This application claims the benefit of priority to U.S. Provisional Application No. 61/808,034 filed Apr. 3, 2013, the disclosure of which is incorporated herein by reference.

TECHNICAL FIELD

This disclosure relates generally to a table assembly for use in an aircraft.

BACKGROUND

Because functional space aboard an aircraft is delivered at a cost premium making that space and the associated equipment in that space multi-functional is an outcome preferred by customers. The use of a tray table that is capable of tracking forward toward a seated occupant and locking in position is one such feature that enhances the space aboard an aircraft by making the space multi-functional. This feature allows the table to be moved closer to a person where it is desired to be closer to the table for tasks such as eating, working on a computer or using a smart phone without sacrificing leg room as is often the case when the seat occupant tracks toward the table.

SUMMARY

The present disclosure is directed to a tracking table assembly within an aircraft for use by passengers to position food, beverages, reading materials, documents and computer equipment over their lap as needed. The table assembly includes a primary leaf, a table bracket and a secondary rotating leaf secured to the primary leaf. The tracking table assembly further includes an adapter plate attached atop at least one pillow block wherein the table bracket is in turn secured to the adapter plate. The at least one pillow block rests atop one or more linear rails. The pillow block is capable of longitudinally traversing the rails upon which it rests. Hard stops on both ends of the rails prevent the tracking table assembly from traversing beyond the stops.

A serrated track is positioned adjacent to and running parallel to the rails. A serrated pawl capable of locking engagement with the serrated track is positioned atop a plunger of a solenoid. The solenoid is positioned perpendicular to the serrated track. When activated by the user the solenoid retracts the plunger and the serrated pawl separates from engagement with the serrated track thereby allowing movement of the tracking table assembly along the rail. With the serrated pawl not engaging the rail the user is free to position the tracking table assembly anywhere along the length of the rail to accommodate their particular needs. Once the tracking table is in the desired position over the lap the user deactivates the solenoid and the serrated pawl reengages the serrated track locking the table assembly in position.

For the foregoing reasons, there is a need for a tracking table assembly that is foldable to decrease the area over the lap when the need for supporting work related materials or food is diminished.

For the foregoing reasons, there is a need for a tracking table assembly that translates toward and away from the seated occupant to accommodate the user's particular needs and body size without sacrificing leg room.

For the foregoing reasons, there is a need for a tracking table assembly that can be readily repositioned and then locked into a position that is accommodating to the user.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
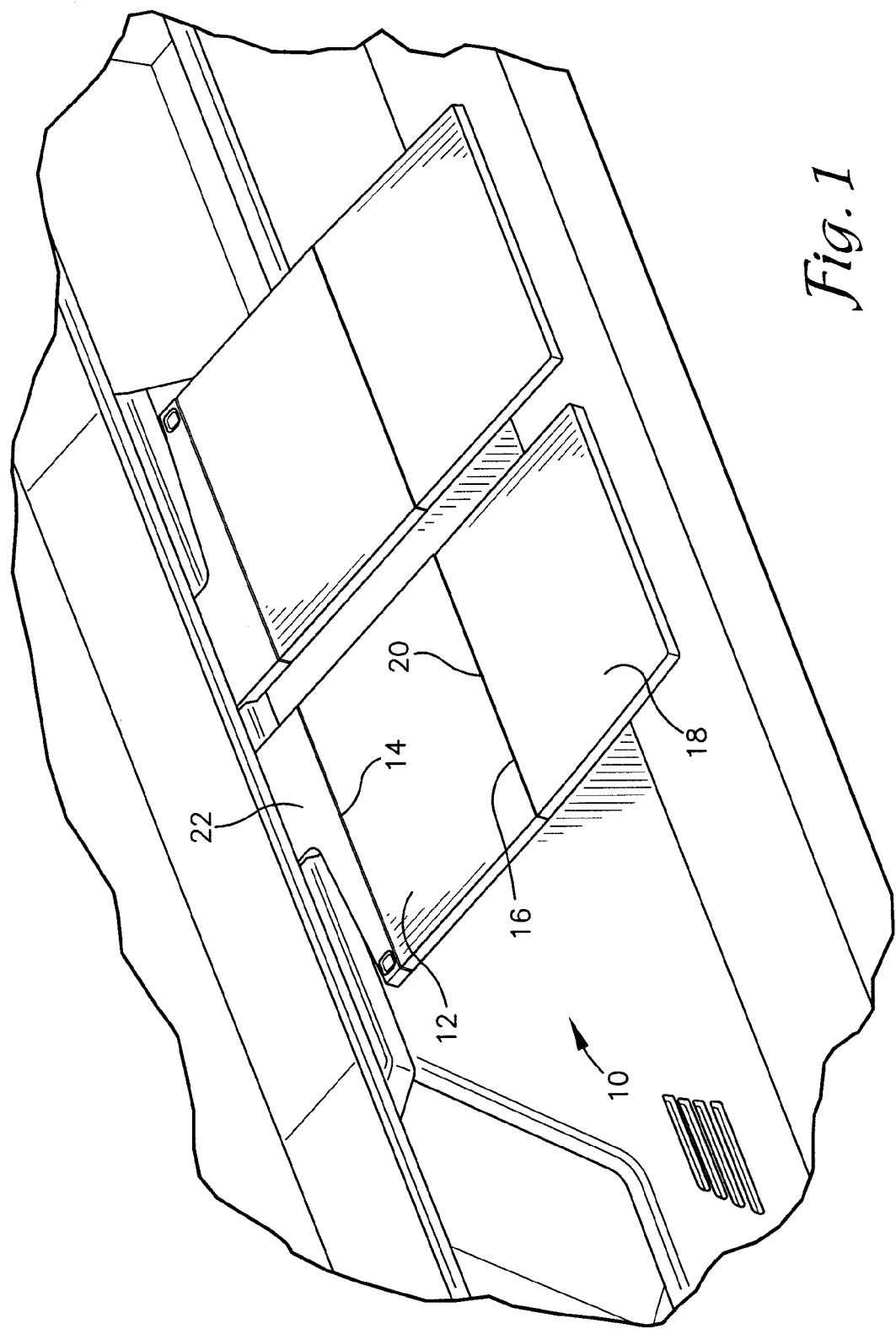
FIG. 1 illustrates an embodiment of a tracking table assembly.

As seen in FIG. 1, the tracking table 10 is comprised of a primary leaf 12 with a first edge 14 and a second edge 16. Attached adjacent the primary leaf is a secondary rotating leaf 18 that is secured to the second edge 16 of the primary leaf 12. The secondary rotating leaf 18 is secured to the primary leaf 12 via a hinged mechanism 20 and a hard stop (not shown) that prevents the secondary leaf 18 from rotating lower than the horizontal orientation of the primary leaf 12 but facilitates folding over of the secondary leaf 18 on top of the primary leaf 12 at the second edge 16. The primary 12 and secondary 18 leaves are preferably fabricated from a rigid, yet lightweight material, such as an engineered plastic, a composite or aluminum.

Figure 2:
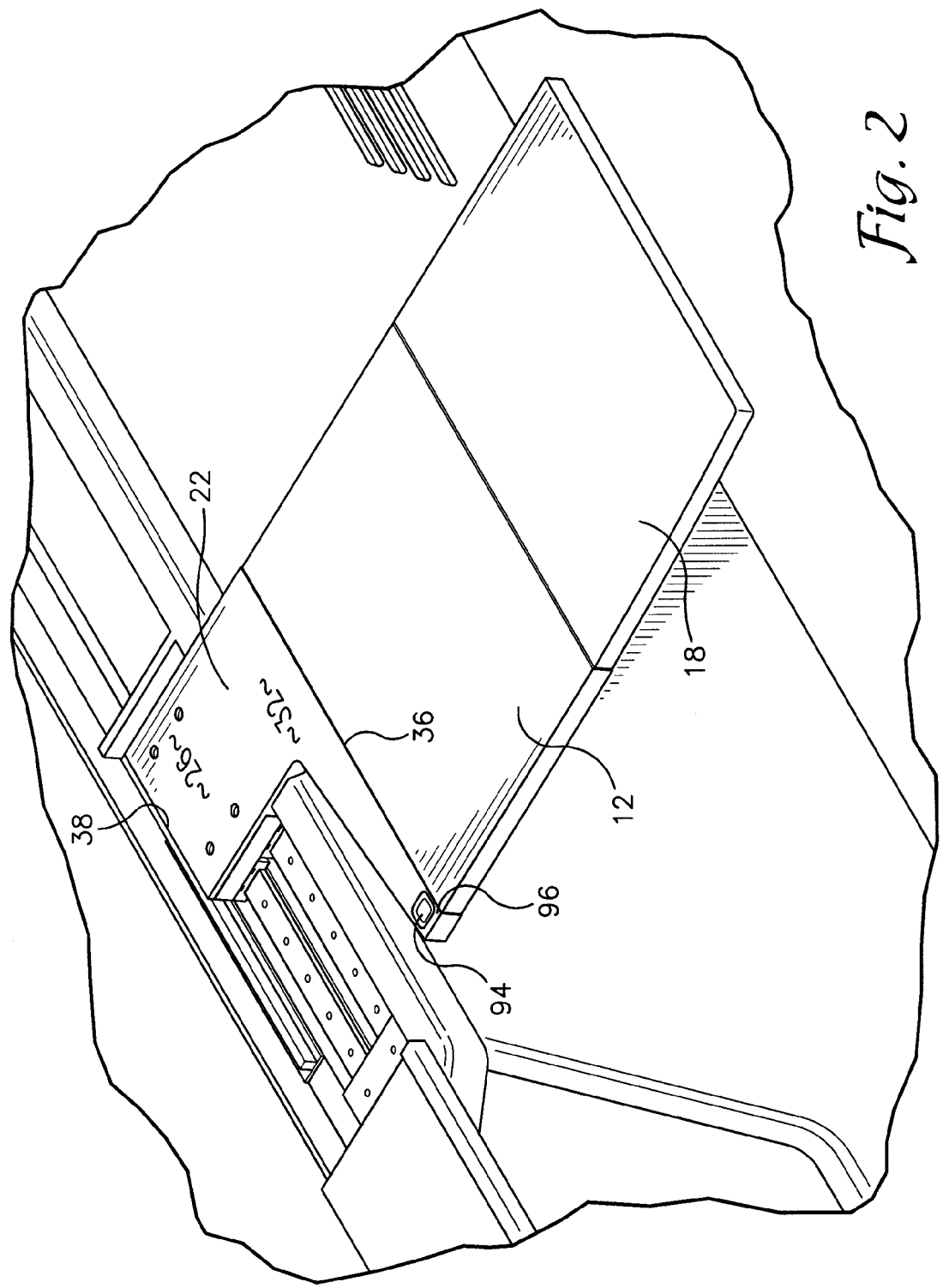
FIG. 2 illustrates a perspective view of an embodiment of a tracking table assembly revealing the linear track mechanism.
Figure 3:
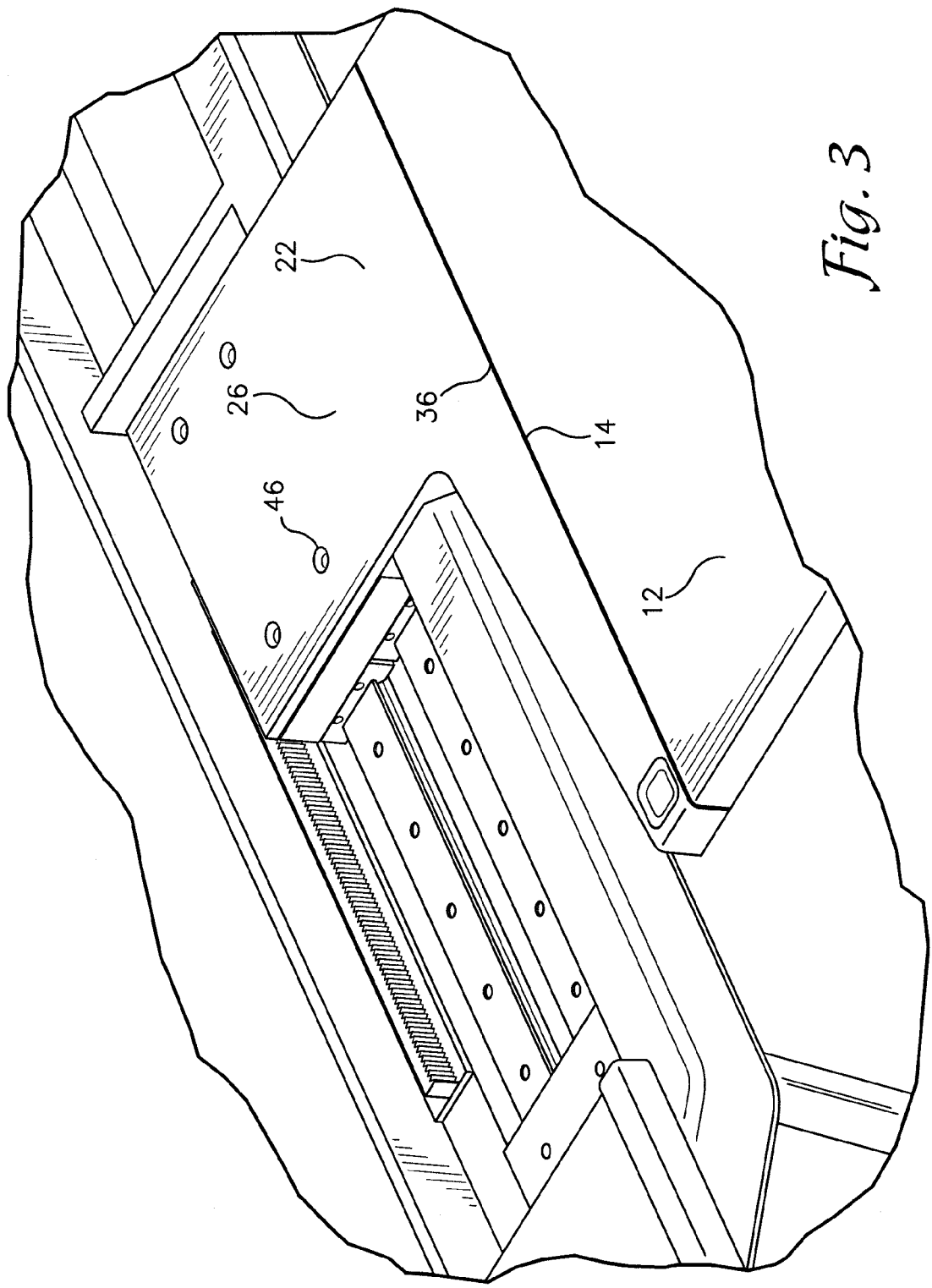
FIG. 3 illustrates a perspective view of embodiments of a portion of the primary leaf, table bracket, linear rails and pillow blocks.
Figure 7:
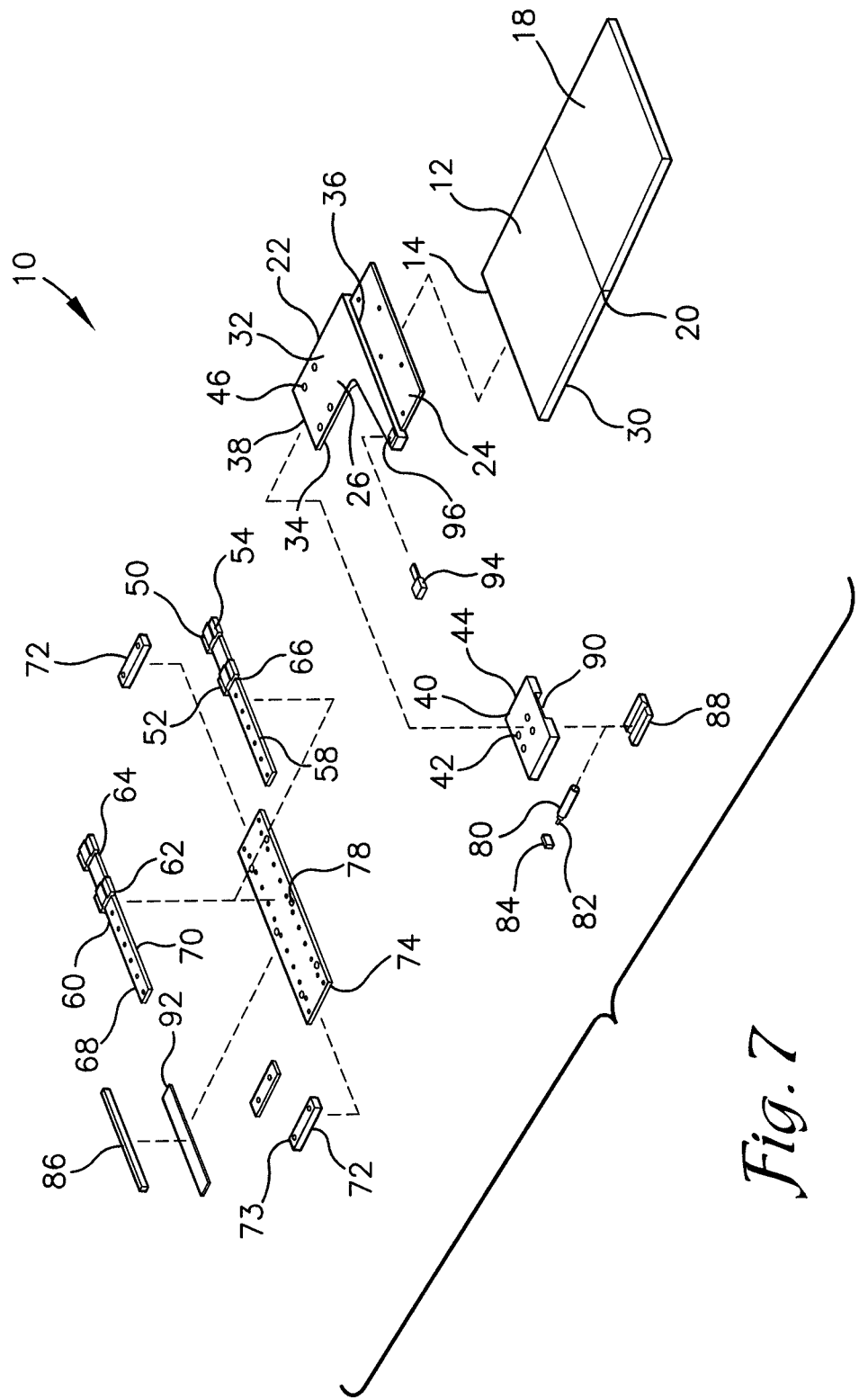
FIG. 7 is a supplemental exploded view of an embodiment of the tracking table assembly.

As seen in FIGS. 1-3, secured to the primary leaf 12 is a table bracket 22. The table bracket, as seen in FIG. 7, has a flange 24 that extends outwardly from the main body 26 of the table bracket 22. The flange 24 has a plurality of holes through which screws 28 or other attachment means are passed into the back face 30 of the primary leaf 12. The flange 24 preferably extends outwardly from the main body 26 of the table bracket a sufficient distance to provide support for the primary and secondary leaves 12, 18. The table bracket 22 main body 26 has an upper face 32, a lower face 34, a first edge 36 and a second edge 38, the first edge 36 of the table bracket 22 abuts the first edge 14 of the primary leaf 12. The second edge 38 of the table bracket main body 26 extends outward away from the primary and secondary leaves 12, 18.

The main body 26 and the flange 24 of the table bracket 22 are preferably fabricated from a material capable of withstanding impact loading without fracturing. The main body 26 and the flange 24 are of a sufficient thickness to minimize weight and yet still provide sufficient structural robustness to avoid fracturing under loads applied by the placement of foods, documents and computer equipment.

Figure 4:
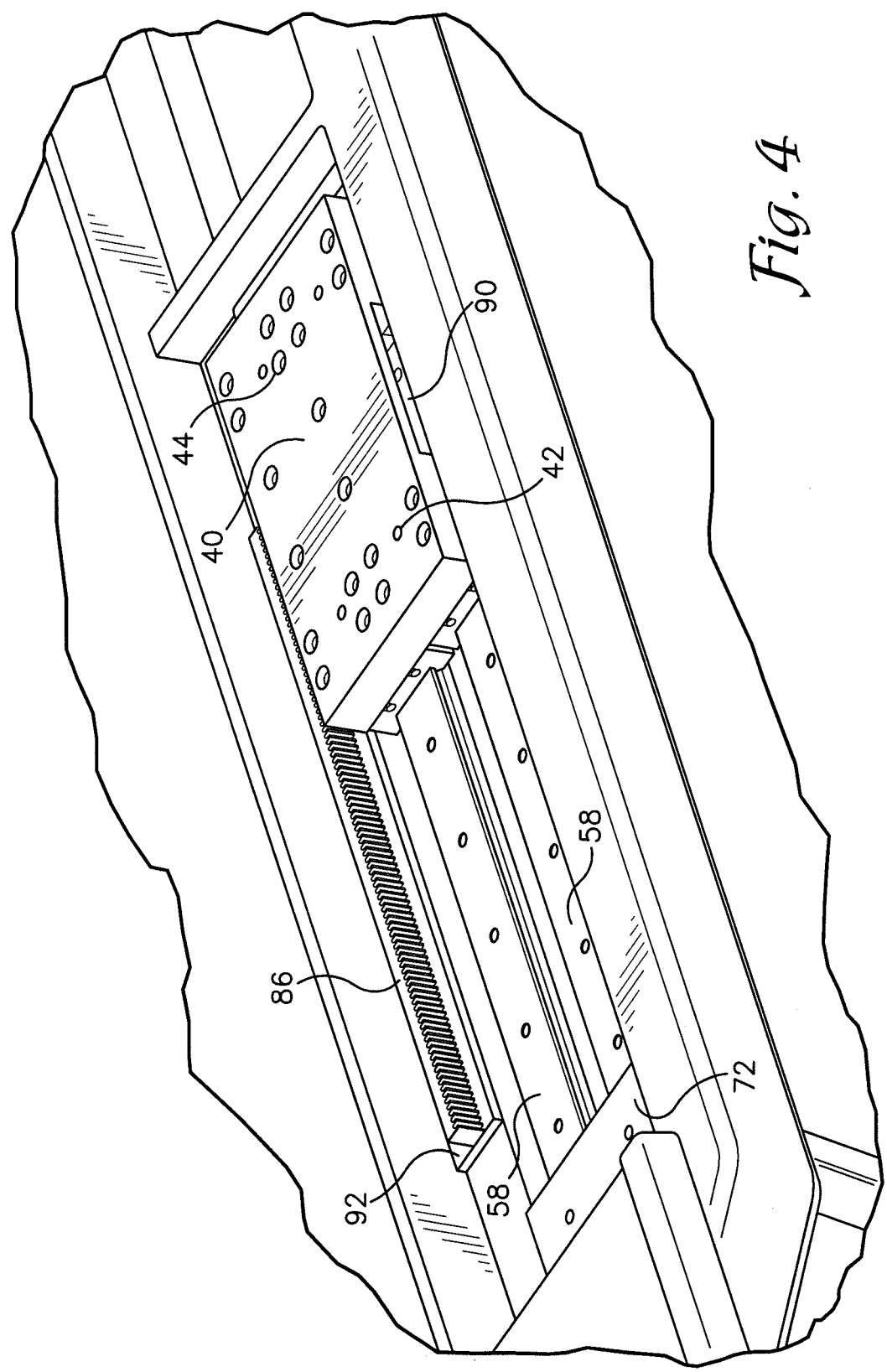
FIG. 4 illustrates a perspective view of an embodiment of the adapter plate mounted atop the pillow blocks.

As seen in FIG. 4 an adapter plate 40 is utilized as part of the overall tracking table assembly. The adapter plate, when fully operational is positioned beneath the lower face 34 of the main body 26 of the table bracket 22. The adapter plate 40 is configured with a series of threaded 42 and unthreaded countersunk holes 44 throughout. As seen in FIG. 3, the main body 26 of the table bracket 22 has similarly sized holes 46 that align with the threaded holes 42 of the adapter plate 40. Preferably four screws (not shown) or other functionally equivalent fasteners are passed through the holes 46 in the table bracket 22 and into the threaded holes 42 in the adapter plate 40. These screws secure the table bracket 22 and adapter plate 40 together.

Figure 5:
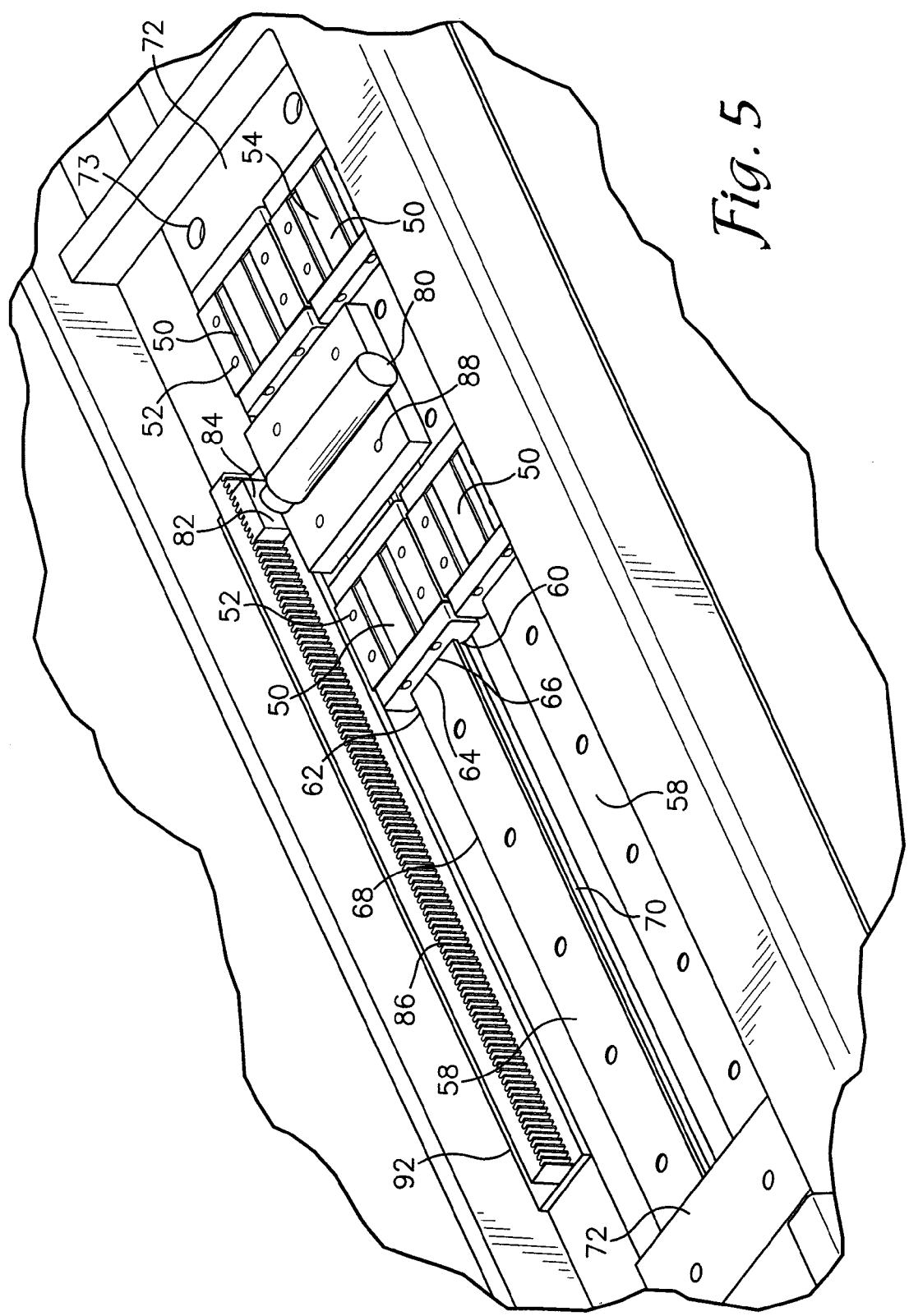
FIG. 5 illustrates a perspective view of embodiments of the pillow blocks, solenoid and serrated pawl engaging a serrated track.

As seen in FIG. 5 the adapter plate 40 is removed and disposed beneath the adapter plate are pillow blocks 50. In the preferred embodiment, the adapter plate 40 preferably rests upon four pillow blocks 50; however, alternative embodiments may employ a unibody pillow block or dual pillow blocks, for example without deviating from the spirit of the implementation. The pillow blocks 50 have a plurality of threaded holes 52 sunk into the top surface 54. When the adapter plate 40 is positioned atop the pillow block 50 screws 56 are passed through the adapter plate 40 and into pillow block threaded holes 52 to secure the two components together. The adapter plate 40 is preferably constructed of aluminum; however, an engineered plastic may also be utilized.

As seen in FIG. 5 situated beneath the pillow blocks 50 are linear rails 58 upon which the pillow blocks may slide. The pillow blocks 50 and the linear rails 58 are effectively interlocked together. As seen in FIG. 5, the pillow blocks 50 include small flanges 60, 62 extending outwardly from a channel 64 cut into the underside 66 of the blocks 50. The small flanges 60, 62 engage with grooves 68, 70 disposed within each side of the linear rails 58. The engagement between the small flanges 60, 62 and the grooves 68, 70 in the linear rails prevent the entire tracking table assembly 10 from rotating when weight is placed on the primary and secondary leaves 12, 18 by the user. In order to install the pillow blocks 50 onto the linear rails 58 the pillow blocks are preferably slid onto the linear rails at one end of each rail prior to installation of the tracking table stops 72 and securement of the linear rails to the installation plate 74 and ultimately to the structure of the vehicle. The grooves 68, 70 run the entire length of the linear rails 58 allowing the pillow blocks 50 to translate the entire length of the rails 58. Translation of the pillow blocks is halted at each end of the linear rails 58 by tracking table stops 72. The stops 72 halt the movement of the pillow blocks 50 by blocking the path of the pillow blocks 50 serving as a hard stop at each end of the rail. The hard stops 72 are mounted to the supporting structure with the aid of screws or other comparable securement devices passed through holes 73 in each of the hard stops.

Figure 6:
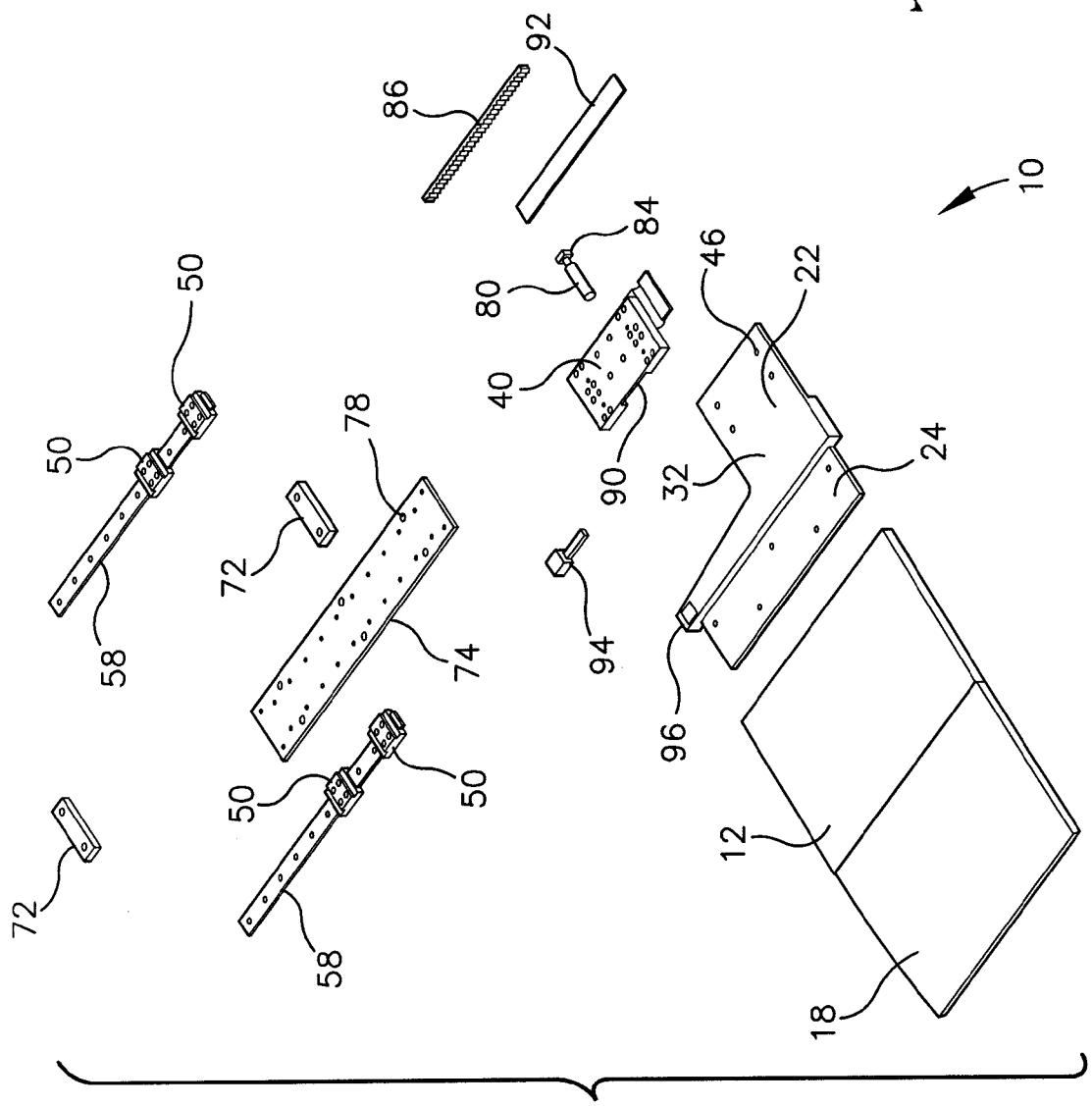
FIG. 6 is an exploded view of an embodiment of the tracking table assembly.

As seen in FIG. 6, the linear rails 58 are in turn secured to a linear rail installation plate 74. The installation plate 74 serves as the foundation for the slidable mechanism comprising the rails 58, pillow blocks 50 and adapter plate 40. Screws (not shown) are passed through holes 78 in the linear rails and into the installation plate 74. The installation plate 74 in turn is secured to the supporting structure by passage of screws, or similar securing means, into the supporting structure.

Returning to FIG. 5, disposed beneath the adapter plate 40 and between the pillow blocks 50 is a solenoid 80. The solenoid 80 is energized through switching means located on the table bracket 22. At the operational end of the solenoid 80 is a plunger 82. The plunger extends outwardly from the solenoid and the far end of the plunger is a serrated pawl 84. The serrated pawl 84 is configured for locking engagement with a serrated track 86 that runs parallel to the linear rails 58. When the solenoid 80 is energized by the user manipulating a switch mechanism the plunger 82 is withdrawn and the serrated pawl 84 disengages from the serrated track 86. The user is then free to translate the entire table assembly 10 forward or backward between the hard stops 72 to a position that is comfortable for their particular needs.

As seen in FIG. 5 and as noted immediately above, the disclosed embodiment has the solenoid 80 positioned between two sets of pillow blocks 50 and beneath the adapter plate 40. The solenoid 80 rests atop a solenoid cradle 88 and is covered by the adapter plate 40. As seen in FIGS. 4 and 6, the adapter plate 40 includes a cutout cavity 90 under which the solenoid 80 is covered. The solenoid cradle 88 may be variously configured; however, the objective of the cradle 88 is to rigidly secure the solenoid in position as the serrated pawl 84, solenoid plunger 82 and solenoid 80 will be subject to considerable forces as the seat occupant exerts pressure on the primary and secondary leaves 12, 18 during normal use of the table assembly.

The solenoid 80 is energized and retracts the serrated pawl when the user performs an action, such as depressing a momentary switch 94, as seen in FIG. 2. The momentary switch 94 is preferably located in a cutout 96 on the table bracket 22 where it is readily accessible by a user. The electrical connection between the momentary switch 94 and the solenoid 80 is comprised of wires (not shown) that are located beneath the table bracket 22 and that lead directly to the solenoid 80 beneath the adapter plate 40. All wiring is hidden from view by the user of the table assembly.

The serrated track 86, as shown in FIG. 5, is adjacent to and runs parallel with the linear rails 58. The serrated track 86 rests atop a spacer 92. The spacer 92 elevates the serrated track 86 so that there is optimal engagement between the serrated track 86 and the serrated pawl 84. The serrated track 86 may also optionally be secured to the spacer 92 at the bottom edge of the serrated track with the spacer 92 secured to the supporting structure through various attachments means that are well known to those skilled in the art.

In operation, the user is seated in the aircraft seat with the tracking table assembly 10 placed directly in front of her. The user has the option of utilizing both the primary leaf 12 and the secondary leaf 18 or rotating the secondary leaf 18 over atop the primary leaf 12 if less area of a supporting surface is desired. Should the user need to reposition the entire tracking table assembly 10 either closer or farther away, the momentary switch 94 located within the table bracket 22 is depressed. Once depressed the solenoid 80 is energized, with power to energize the solenoid being provided by the aircraft electrical system or alternatively a stand-alone battery.

Once the solenoid 80 is energized the plunger 82 is retracted thereby disengaging the serrated pawl 84 from the serrated track 86. Once the serrated pawl 84 is retracted the entire assembly is free to translate along the linear rails 58. The pillow blocks 50 upon which the adapter plate 40 rests may move bi-directionally along the linear rails and remain engaged with the rails because of the inwardly extending flanges 60, 62 that are received into the rail grooves 68, 70. The range of movement of the pillow blocks 50 is limited by the hard stops 72 at each end of the linear rails.

Once the user decides upon a preferred position for the tracking table assembly 10 she releases the momentary switch 94 which de-energizes the solenoid 80. Once the solenoid is de-energized the solenoid plunger 82 extends outwardly and the serrated pawl 84 reengages the serrated track 86. The reengagement of the pawl 84 and serrated track 86 locks the entire assembly into a position that is comfortable for the user.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

We claim:

1. A foldable tracking table assembly for use in a vehicle to support the accessories and meal items of a passenger, the tracking table assembly comprising;
   at least one linear rail upon which at least one pillow block is capable of slidable longitudinal translation;
   a solenoid cradle disposed atop the at least one pillow block;
   a solenoid disposed atop the solenoid cradle, wherein a solenoid plunger assembly extends outwardly from a first end of the solenoid;
   a serrated track disposed adjacent to and running parallel to the at least one linear rail, the serrated track configured for locking engagement with the solenoid plunger assembly;
   an adapter plate positioned over the solenoid and solenoid cradle and secured to the at least one pillow block;
   a table bracket with an outwardly extending flange, the outwardly extending flange secured to the adapter plate, wherein when the solenoid is energized by a passenger activated switch connected to a power supply, the solenoid plunger assembly disengages from the serrated track thereby allowing the at least one pillow block to traverse atop the at least one linear rail to a position that accommodates the user.

2. The foldable tracking table assembly of claim 1, wherein the at least one pillow block has an underside.

3. The foldable tracking table assembly of claim 2, wherein the underside includes a channel.

4. The foldable tracking table assembly of claim 3, wherein the channel includes at least two inwardly extending flanges.

5. The foldable tracking table assembly of claim 4, wherein the at least one linear rail includes a first side and a second side.

6. The foldable tracking table assembly of claim 5, wherein the first side and the second side of the linear rail each include a groove for receiving the inwardly extending flanges of the at least one pillow block.

7. The foldable tracking table assembly of claim 1, wherein the at least one linear rail is secured to an installation plate, the installation plate in turn secured to a surface of the vehicle.

8. The foldable tracking table assembly of claim 7, wherein the installation plate is secured to a vehicle interior structure.

9. The tracking table assembly of claim 1, wherein the at least one linear rail is preferably two linear rails.

10. The tracking table assembly of claim 1, wherein a primary table leaf is secured to the outwardly extending flange of the table bracket.

11. The tracking table assembly of claim 10, wherein a secondary table leaf is rotatably secured to the primary table leaf.

12. The tracking table assembly of claim 1, wherein the solenoid plunger assembly includes a plunger with a distal end.

13. The tracking table assembly of claim 12, wherein a pawl is secured to the distal end of the solenoid plunger assembly for locking engagement with the serrated track.

14. The tracking table assembly of claim 1, wherein the switch is disposed within a cutout positioned within the table bracket.

15. The tracking table assembly of claim 1, wherein the at least one linear rail has a first and a second end.

16. The tracking table assembly of claim 15, wherein the longitudinal translation of the at least one pillow block along the linear rail is limited by a hard stop secured to the first and second end of the linear rail.

17. The tracking table assembly of claim 1, wherein the adapter plate has an upper face and a lower face.

18. The tracking table assembly of claim 17, wherein the lower face of the adapter plate includes a recess to receive the solenoid and solenoid cradle when in position atop the at least one pillow block.

19. A foldable tracking table assembly for use by a passenger in a vehicle, the tracking table assembly comprising;
   a primary leaf with a first end and a second end;
   a table bracket with an upper face, a lower face, a first edge and a second edge, the first edge of the table bracket secured to the first end of the primary leaf;
   a secondary leaf rotatably secured to a second end of the primary leaf;
   an adapter plate with an upper surface disposed atop at least one pillow block, the lower face of the table bracket in contact with the upper surface of the adapter plate;
   at least one linear rail upon which the at least one pillow block is capable of slidably longitudinally traversing;
   a serrated track disposed adjacent to and running parallel to the at least one rail;
   a serrated pawl capable of locking engagement with the serrated track;
   a solenoid to facilitate the locking engagement of the pawl with the serrated track, the solenoid further disposed proximate the at least one pillow block and beneath the adapter plate, wherein when energized by the activation of a passenger operated switch mechanism, the solenoid withdraws the serrated pawl from locking engagement with the serrated track thereby allowing the at least one pillow block to traverse atop the at least one linear rail to a position that accommodates the user.

20. The foldable tracking table assembly of claim 19, wherein the at least one pillow block has an underside.

21. The foldable tracking table assembly of claim 20, wherein the underside includes a channel.

22. The foldable tracking table assembly of claim 21, wherein the channel includes at least two inwardly extending flanges.

23. The foldable tracking table assembly of claim 22, wherein the at least one linear rail includes a first side and a second side.

24. The foldable tracking table assembly of claim 23, wherein the first side and the second side include a groove for receiving the inwardly extending flanges of the at least one pillow block.

25. The foldable tracking table assembly of claim 19, wherein the at least one linear rail is secured to an installation plate.

26. The foldable tracking table assembly of claim 25, wherein the installation plate is secured to a vehicle interior structure.

* * * * *